Oct. 31, 1967     K. W. JOHNSON     3,350,703
GAS CONCENTRATION DETECTION APPARATUS
Filed July 17, 1964
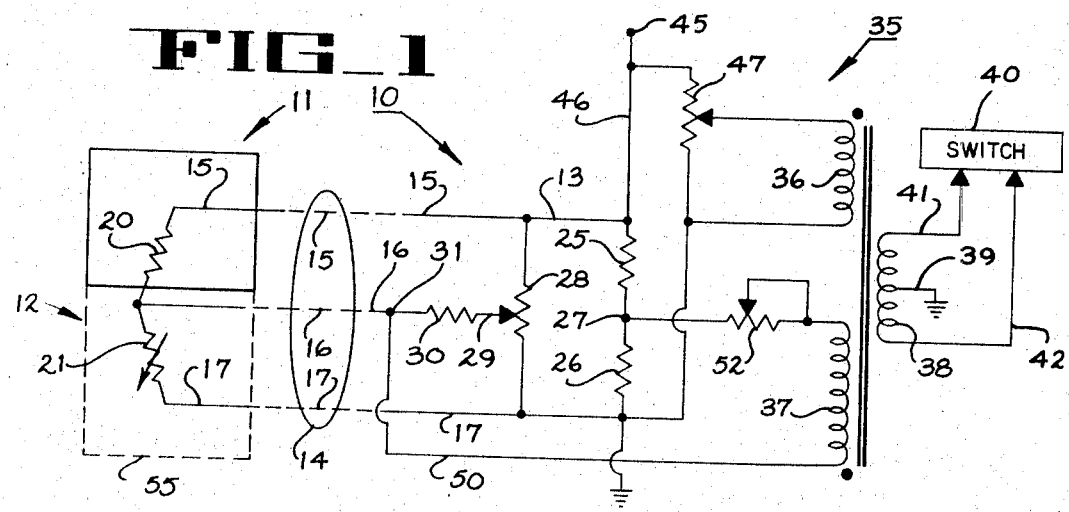
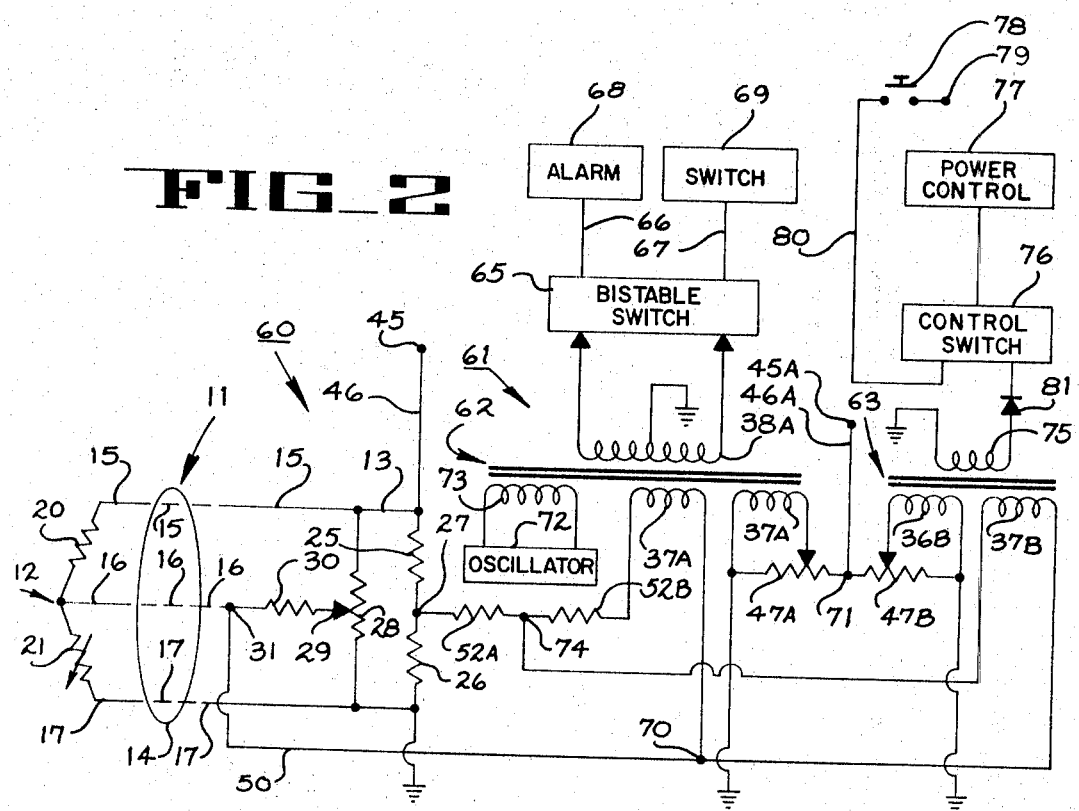
INVENTOR.
KENNETH W. JOHNSON
BY *Robert R. Thornton*
ATTORNEY United States Patent Office 3,350,703
Patented Oct. 31, 1967

3,350,703
GAS CONCENTRATION DETECTION
APPARATUS
Kenneth W. Johnson, Palo Alto, Calif., assignor to Johnson-Williams, Inc., Mountain View, Calif., a corporation of California
Filed July 17, 1964, Ser. No. 383,484
4 Claims. (Cl. 340—237)

A gas concentration detection apparatus having a bridge impedance element whose output is a function of gas concentration and which is applied to a magnetic comparator having a substantially rectangular hysteresis characteristic. The comparator has two output states, and is switched in output state, thereby actuating an alarm or other control function, upon the application to the comparator of a bridge impedance element output which exceeds a preselected magnitude.

Gas detectors of the bridge type are well-known and generally rely upon the change in impedance of an active element in the bridge circuit in response to the presence of a gas. The active element may be a simple thermal detector element, or the active element may in fact initiate combustion of the gas, as is described in U.S. Patent No. 2,023,751. In either event, the impedance of the active element in the bridge changes in response to the presence of the gas. This change in impedance unbalances the bridge, so as to produce an electrical output, the magnitude of which is a function of the concentration of the gas being detected.

Such conventional gas detectors, while generally satisfactory, have not been suitable for utilization under adverse conditions of moisture, vibration, and the like, due to their reliance upon mechanical elements in associated circuitry to indicate the gas concentration or to actuate alarms or the like in response to a pre-determined gas concentration. For example, the use of meters and mechanical relays in such devices precludes their reliable operation under adverse shock conditions over an extended period of time. Thus, a gas detector of the combustible type, as described in the aforesaid patent, utilizing conventional mechanical relay and meter circuitry, is unsatisfactory when operated in conjunction with an automatic coal drilling machine to shut down operation of the machine in the presence of a dangerous concentration of methane gas. The vibration and shock to which the detector mechanical circuitry is subject in such an application, together with the moisture and other atmospheric contamination encountered, bring on an early failure in the operation of such a conventional device.

According to the present invention, a gas detector, of the bridge type utilizing an active element, applies the bridge output to a signal winding of a comparator. The comparator has a control winding through which an electrical current flows to produce a magnetic flux in opposition to the magnetic flux produced by the flow of bridge unbalance current through the signal winding. When the magnetic flux produced by the signal winding current flow exceeds a predetermined proportion of magnetic flux produced by control winding current flow, an output signal is induced in an output winding of the comparator. The output signal is applied to a control element, such as a switch, in order to actuate an appropriate control element or circuit. In the preferred embodiment, the comparator utilizes a magnetic core of material having a substantially rectangular hysteresis characteristic. The comparator preferably also includes a pulse source for periodically applying electrical pulses to a pulse input winding of the magnetic comparator, so as to produce a magnetic flux, which augments the signal winding magnetic flux periodically.

The invention may be more readily understood by referring to the accompanying drawing in which:

FIGURE 1 is a schematic diagram of a gas detector according to the invention; and FIGURE 2 is a schematic diagram of alternate embodiment of the invention having two output control circuits.

Referring now to FIGURE 1, a gas detector 10 has a detector element 11 of the impedance bridge type divided into detector portion 12 and a fixed portion 13, connected together by a connector, indicated by the loop 14. The connector 14 may be either flexible, permitting relocation of the detector portion 12, or rigid, as desired. The connector 14 contains a first electrical conductor 15, a second electrical conductor 16, and a third electrical conductor 17 extending between the detector portion 12 and fixed portion 13, and shown in dotted lines as being enclosed by the loop 14.

The detector portion 12 includes a reference impedance element 20, and an active impedance element 21, which may be an appropriate thermally responsive resistance. The active element 21 is the element whose impedance changes in response to the presence of the gas being detected. The reference element 20 may be the same as the active element 21, but protected from gas flow, and is connected between the first and second conductors 15, 16. The active element 21 is connected between the second and third conductors 16, 17.

The fixed bridge portion 13 includes a pair of matched bridge impedances 25, 26, which may be fixed resistors, connected together at a junction 27 so as to be connected between the first and third conductors 15, 17. The impedances 20, 21, 25, and 26 thus form a Wheatstone bridge. A zero set potentiometer 21 is connected between the first and third conductors 15, 17 in parallel with the impedances 25, 26. The potentiometer 21 has its arm 29 connected by a zero limit resistor 30 to the second conductor 16 at a junction 31.

A comparator 35, preferably of the magnetic type having a first magnetic state and a second magnetic state, has a control winding 36, a signal winding 37 and an output winding 38. Conventional dot notation is utilized to indicate the sense of the signal and control windings 36, 37, for the embodiment shown in FIGURE 1. The output winding 38 has a center tap connection 39 connected to ground or a common connection so as to apply an output signal induced therein to a switch 40 through first and second output leads 41, 42. In the preferred embodiment a magnetic comparator having a core of a material having a substantially rectangular hysteresis characteristic is utilized.

An electrical input terminal 45 has a DC potential applied thereto. For the dot notation used, the potential will be positive. A potential input lead 46 is connected between the terminal 45 and the first conductor 15, so as to apply the electrical potential to the bridge circuitry. A comparator actuation point control means, shown for purposes of illustration as a bias potentiometer 47, is connected between the input lead 46 and the third conductor 17, so as to be connected in parallel with the fixed impedances 25, 26. The control winding 36 is connected between the conductor 17 and the arm of the potentiometer 47. The signal winding 37 is connected by a second conductor branch 50 to the junction 31 and to the junction 27 by an upper limit set potentiometer 52.

The operation of the detector 10 of FIGURE 1 will now be described. The detector 10 is first adjusted for zero reading by connecting a conventional galvanometer type meter, such as a voltmeter or milliameter, between the junctions 27, 31. The potentiometer arm 29 is then adjusted to produce a zero reading on the meter. The bridge is now balanced. This adjustment is carried out in an appropriate atmosphere for calibration; that is, if a combustible gas is to be detected, the zero setting adjustment is made in the absence of such a gas. If the detector is of the thermal type, the adjustment is made utilizing a calibration sample.

The device is preferably adjusted so as not to be subject to being set to be actuated at a gas concentration in excess of the maximum to be detected, the lower explosive limit of a combustible gas, for example. Such an adjustment may be accomplished by initially setting the control potentiometer 47 to correspond to a maximum concentration of gas or by otherwise unbalancing the bridge to correspond to the maximum concentration of gas. The limit set potentiometer is then set to limit the maximum current flow through the signal winding 37 to correspond to the maximum concentration of gas desired to be detected. The limit set potentiometer is preferably disposed so as to be hidden within the device, in order to prevent subsequent tampering with this setting, After the limit set potentiometer 52 has been so set, the control potentiometer is then adjusted so as to actuate the device at a gas concentration equal to or less than the gas lower explosive limit concentration. However, the control potentiometer can not now be set to correspond to a concentration greater than the gas lower explosive limit without first changing the setting of the limit set potentiometer 52. If only a single gas or mixture is to be detected, the limit set potentiometer can be replaced by a fixed resistor of an appropriate value, thus insuring that the device always is actuated at or below the maximum concentration desired to be detected.

In operation, when the gas is present at the detector 12, the impedance of the active element 21 changes. For the purpose of explanation, it will be assumed that the active element is of a type utilizing combustion and increasing in resistance therewith. The increase in resistance of the active element 21 unbalances the bridge, so as to cause a flow of current between the junctions 27, 31 through the second conductor branch 50, signal winding 37, and limit set potentiometer 52. Bias current flows through the control winding 36, producing magnetic flux in opposition to the magnetic flux resulting from the current flow through the signal winding 37. The bias current flow is substantially constant and is determined by the setting of the control potentiometer 47. With a zero concentration of the gas being detected, the bias current maintains the comparator in its first magnetic state. In response to a concentration of gas corresponding to the alarm setting existing at the detector 12, the unbalance in the bridge is sufficient to cause a magnitude of signal current flow through the signal winding 37 sufficient to produce a magnetic flux which exceeds the flux resulting from the current flow through the control winding 36. The comparator 35 is thereby switched from its first to its second magnetic state. Upon the switching of the comparator 35 to its second magnetic state, an output signal is induced in the output winding 38. The output signal is applied to the switch 40 through the output leads 41, 42, so as to actuate the switch 40. The actuation of the switch 40 initiates the desired alarm or other control function.

The use of the conductor 14 permits the location of the detector element 12 at a position remote from the location of the remainder of the circuitry. Thus, the detector element 12 may be located adjacent the drill in a coal drilling operation, and the remaining circuitry and components located in close proximity to the operator. Where the detector element 12 is located remote from the remainder of the circuitry and adjacent a work operation, an appropriate protective enclosure 55 is preferably provided to contain the detector element 12. In the preferred embodiments the enclosure 55 has appropriate fluid passages to facilitate the flow of the gas being monitored over the active element 21, while shielding the reference element 20 therefrom. When the atmosphere is dust laden or there is danger of particulate material striking the detector element and causing failure, appropriate baffling of the protective enclosure 12 permits satisfactory gas passage while protecting the detector element 12 proper. The use of a flexible connector 14 permits relocation of or probing with the detector element 12. A rigid or fixed connector 14 may be utilized in a fixed location.

Referring now to FIGURE 2, a gas detector 60 has a detector element 11, which is the same as that previously described. An appropriate protective enclosure, such as that described with respect to FIGURE 1, may be utilized. The gas detector 60 has a comparator portion 61 which includes a first magnetic comparator 62 and a second magnetic comparator 63. The first and second magnetic comparators 62, 63 are similar to the magnetic comparator described with respect to FIGURE 1. However, certain differences between the three magnetic comparators 35, 62, and 63 exist, as will now be described.

The first magnetic comparator 62 is of the nonlatching type, that is, the comparator switches between a first and a second magnetic state in accordance with the concentration of the gas detected. The first magnetic comparator 62 has a center-tapped output winding 38A, whose output is applied to the two inputs of a bistable switch 65. The bistable switch 65 may be, for example, a transistor switch or a flip-flop of any of the various conventional constructions. The bistable switch 65 has a pair of outputs of opposite polarity, phase, potential or other characteristic, which are applied through output leads 66 and 67 to an alarm 68 and a switch 69, respectively. The alarm 68 can, for example, be either a visible or an audible alarm or both. The switch 69, can, for example, be any conventional pulse, voltage, or current actuated switching device or the like, used to switch any desired indicator or control device or function. It is to be understood that the alarm 68 and switch 69 are operated by the opposite output characteristics of the bistable switch 65 existing in the leads 66, 67. The first magnetic comparator 62 has a signal input winding 37A, which is connected to the junction 27 through a common limit set resistor 52A and a second limit set resistor 52B. The signal winding 37A is connected to the conductor 50 at a junction 70. A control winding 36A is connected in parallel with a first comparator actuation point control potentiometer 47A through the first control potentiometer arm. The first control potentiometer 47A is connected between ground and an electrical input terminal 45A by an electrical input lead 46A at a junction 71. An oscillator 72 is connected to an oscillator winding 73 of the first magnetic comparator 62 so as to apply the oscillator output thereto.

The second magnetic comparator 63 has a signal input winding 37B which is connected across the detector bridge by being connected to the conductor 50 at the junction 70 and being connected to the junction 27 by the common limit resistor 52A at a junction 74 between the limit resistors 52A and 52B. The second comparator 63 has a control winding 36B connected in parallel with a second comparator actuation point control potentiometer 47B through the second control potentiometer arm. The second control potentiometer 47B is connected between the junction 71 and ground. The second comparator 63 has an output circuit consisting of a single output winding 75 connected between ground and a control switch 76. The control switch 76 may be any appropriate on-off type, which is actuated by the pulse induced in the output winding 75 upon the changing of the magnetic state of the second comparator 63 in response to an increased gas concentration. The output of the control switch 76 is applied to a power control 77 as an on-off gate. The control switch 76 is preferably of the type such that the reverse switching of the magnetic state of the comparator 63 does not affect the control switch 76. Rather, a manual reset switch 78 is connected between a reset signal input terminal 79 and the control switch 76 by a lead 80. In order to re-apply power to the device, the manual reset switch 78 is actuated. Thus, positive control over the application of the power to the device being operated is provided. By utilizing a second limit set resistor 52B in the first magnetic comparator 62, the upper limit to which the first comparator 62 may be set to detect unbalance is made less than that to which the second magnetic comparator 63 can be set, it being assumed that the characteristics of the control and signal windings and control potentiometers for the two comparators 62, 63 are the same. Of course, the electrical characteristics of corresponding ones of these latter components can be varied from each other in order to provide the same safety feature.

The operation of the gas detector 60 will now be decsribed. When an unbalance in the gas detector bridge occurs, current flows between the junctions 27 and 31 through the common limit set resistor 52, the parallel-connected signal winding 37B and signal winding 37A and limit set resistor 52B, and conductor 50. An electrical potential is applied to the input terminal 45A to provide current flow through the control windings 36A, 36B. The oscillator 72 applies its output to the first comparator 62 through the oscillator winding 73. In the preferred embodiment, the oscillator winding current flow is insufficient, by itself, to switch the magnetic state of the comparator. As the flow of current through the signal winding 37A increases, the pulsing of the magnetic circuit by the oscillator output gradually approaches the total effective ampere turns required to switch the magnetic state of the first comparator 62. The pulsing of the first magnetic comparator 62 is utilized to provide a sharp input signal to produce a well-defined switching of the first comparator 62 to its opposite magnetic state. The hysteresis characteristic of the magnetic comparator 62 prevents the immediate reverse switching of the magnetic state of the comparator 62 at the end of the oscillator pulse cycle. However, when the flow of current in the signal winding 37A diminishes from that required, in conjunction with the oscillator pulse, to switch the magnetic state of the first comparator 62, the combined effect of the oscillator pulsing and control winding current provide the necessary ampere turns for reversal of the magnetic state of the comparator.

The second magnetic comparator 63 operates in a manner similar to that previously described with respect to the magnetic comparator of FIGURE 1. However, the magnetic comparator 63 has its output winding connected between ground and the control switch 76 by a uni-directional conductor, such as a diode 81. The purpose of the diode 81 is to prevent actuation of the control switch 76 by reverse switching of the second comparator 63 and to provide a fixed voltage drop in the output winding circuit so that small magnitude pulses, i.e., pulses other than those occurring upon the switching of the magnetic state of the second comparator 63, are not applied to the control switch 76. The polarity of diode connection is selected to preclude the application of a pulse to the control switch when the magnetic comparator 63 changes its state in response to the diminution of gas concentration. It will, of course, be understood that similar use may be made of diodes and the like with respect to the first comparator 62 or the comparator of FIGURE 1. The control switch 76 may be of any appropriate type. For example, a conventional flip-flop can be utilized, in which case the reset switch 78 may be either of the normally open type and connected to a pulse source through the terminal 79 so as to apply an appropriate pulse to switch the control switch 76, or may, more simply, be a normally closed switch which, when activated, opens the circuit continuity in the conducting portion of the flip-flop to reverse its conduction state. The comparators 62, 63 are preferably of the magnetic type having a core of a material having a substantially rectangular hysteresis characteristic. The use of such material provides sharp switching of comparator state while minimizing the generation of false output pulses in response to the oscillator input pulses or to fluctuations in the bias current or the signal current.

The invention claimed is:
1. In a gas detector, the combination of:
   a resistance bridge having an active element whose resistance is a function of gas concentration and a reference resistance element;
   a protective enclosure enclosing the active and reference elements so as to permit gas flow adjacent the active element while shielding the reference element therefrom;
   a magnetic comparator having
      (1) a core of a material having a substantially rectangular hysteresis characteristic,
      (2) a signal winding on said core,
      (3) a control winding on said core, and
      (4) an output winding on said core,
   said comparator having a first magnetic condition and a second magnetic condition, and in which a predetermined magnitude of electrical current flow through the signal winding is operable to switch the comparator from its first to its second magnetic condition and a predetermined magnitude of electrical current flow through the control winding is operable to switch the comparator from its second to its first magnetic condition;
   means for initiating a substantially constant flow of electrical current through the control winding so as to maintain the comparator, in the absence of a selected magnitude of current flow through the signal winding, in its first magnetic condition;
   means for initiating an electrical current flow through the signal winding in response to an unbalance in the resistance bridge, the magnitude of which current flow is a function of the magnitude of the bridge unbalance;
   an output circuit having a first actuation state and a second actuation state; and
   means connecting the comparator output winding to the output circuit and operable to switch the output circuit between its first and second states to correspond in state to the magnetic state of the comparator.

2. The combination of claim 4, and including a second magnetic comparator having
   (1) a second comparator core of a material having a substantially rectangular hysteresis characteristic,
   (2) a second comparator signal winding on said core,
   (3) a second comparator control winding on said core, and,
   (4) a second comparator output winding on said core, said comparator having a first magnetic condition and a second magnetic condition and being switchable therebetween in response to a predetermined differential in electrical current flow magnitude in the signal and control windings, and including means for controlling said differential in current flow as a function of unbalance in the resistance bridge.

3. The combination of claim 1, and in which the magnetic comparator has an oscillator input winding, and including an oscillator whose output is applied to the oscillator input winding, a bistable switch, means connecting the output circuit to the bistable switch so that the output circuit actuation state controls actuation of the bistable switch, and an alarm circuit connected to the bistable switch so as to be actuated thereby.

4. The combination of claim 6, and including a second magnetic comparator having
   (1) a second comparator core of a material having a substantially rectangular hysteresis characteric,
   (2) a second comparator signal winding on said core,
   (3) a second comparator control winding on said core, and
   (4) a second comparator output winding on said core, said comparator having a first magnetic condition and a second magnetic condition and being switchable therebetween in response to a predetermined differential in current flow magnitude in the signal and control windings, means for controlling said differential in current flow as a function of unbalance in the resistance bridge, an output circuit including switch means having first and second actuation states, means for normally maintaining said switch means in its first actuation state, and means for switching said switch means to its second actuation state in response to the switching of the magnetic condition of the second magnetic comparator.

References Cited
UNITED STATES PATENTS 3,239,828    3/1966    Peterman _____ 340—237

FOREIGN PATENTS 792,660    4/1958    Great Britain.

NEIL C. READ, *Primary Examiner.*
D. K. MYER, *Assistant Examiner.*

UNITED STATES PATENT OFFICE
CERTIFICATE OF CORRECTION

Patent No. 3,350,703                 October 31, 1967

Kenneth W. Johnson

It is hereby certified that error appears in the above numbered patent requiring correction and that the said Letters Patent should read as corrected below.

Column 6, line 54, for the claim reference numeral "4" read -- 1 --; column 7, line 3, for the claim reference numeral "6" read -- 3 --.

Signed and sealed this 12th day of November 1968.

(SEAL)
Attest:

Edward M. Fletcher, Jr.                EDWARD J. BRENNER
Attesting Officer                      Commissioner of Patents